US008087647B2

(12) United States Patent
Endo

(10) Patent No.: US 8,087,647 B2
(45) Date of Patent: Jan. 3, 2012

(54) FLUID FILLED TYPE CYLINDRICAL VIBRATION DAMPING DEVICE

(75) Inventor: Masami Endo, Niwa-gun (JP)

(73) Assignee: Tokai Rubber Industries, Ltd., Aichi (JP)

( * ) Notice: Subject to any disclaimer, the term of this patent is extended or adjusted under 35 U.S.C. 154(b) by 664 days.

(21) Appl. No.: 12/292,246

(22) Filed: Nov. 14, 2008

(65) Prior Publication Data

US 2009/0189323 A1    Jul. 30, 2009

(30) Foreign Application Priority Data

Jan. 29, 2008 (JP) ................................ 2008-017230

(51) Int. Cl.
*F16F 5/00* (2006.01)
*F16F 13/00* (2006.01)
(52) U.S. Cl. ............. 267/140.12; 267/140.4; 267/141.4; 267/219
(58) Field of Classification Search .............. 267/219, 267/140.12, 140.4, 141, 141.1, 141.4, 141.5, 267/141.2
See application file for complete search history.

(56) References Cited

U.S. PATENT DOCUMENTS

| 5,037,073 | A  | * | 8/1991 | Matsumoto et al. ..... 267/140.12 |
| 5,370,376 | A  | * | 12/1994 | Ishiyama ................. 267/140.12 |
| 5,429,343 | A  | * | 7/1995 | Maeno et al. ............ 267/140.12 |
| 6,672,574 | B2 | * | 1/2004 | Hamada et al. .......... 267/140.12 |
| 7,275,738 | B2 |   | 10/2007 | Minamisawa |
| 2004/0239020 | A1 | * | 12/2004 | Ito ............................. 267/140.12 |
| 2005/0230889 | A1 | * | 10/2005 | Minamisawa ........... 267/140.12 |
| 2006/0006592 | A1 | * | 1/2006 | Kato ......................... 267/140.12 |
| 2007/0273076 | A1 |   | 11/2007 | Endo et al. |
| 2007/0296128 | A1 | * | 12/2007 | Asano et al. ............. 267/140.12 |

FOREIGN PATENT DOCUMENTS

JP    Y2-7-40751    9/1995

* cited by examiner

*Primary Examiner* — Ruth Ilan
(74) *Attorney, Agent, or Firm* — Oliff & Berridge, PLC

(57) ABSTRACT

A fluid filled type cylindrical vibration damping device, wherein a circumferential end of a stopper member is formed as a mating element smaller in diameter than a circumferentially center section of the stopper member, and is juxtaposed against and supported on a bottom face of a mating groove in a communication passage, to form the communication passage along an entire area between diametrically opposed faces of the mating element and an outer tubular member. A cutout portion is formed extending in a circumferential direction from a circumferential end in a widthwise medial section of the mating element, with the communication passage opening into and communicating with a first fluid chamber at a distal end section of the cutout portion, and at two widthwise side sections of the mating element, respectively, thereby defining an orifice passage connecting the first fluid chamber with a second fluid chamber.

10 Claims, 11 Drawing Sheets

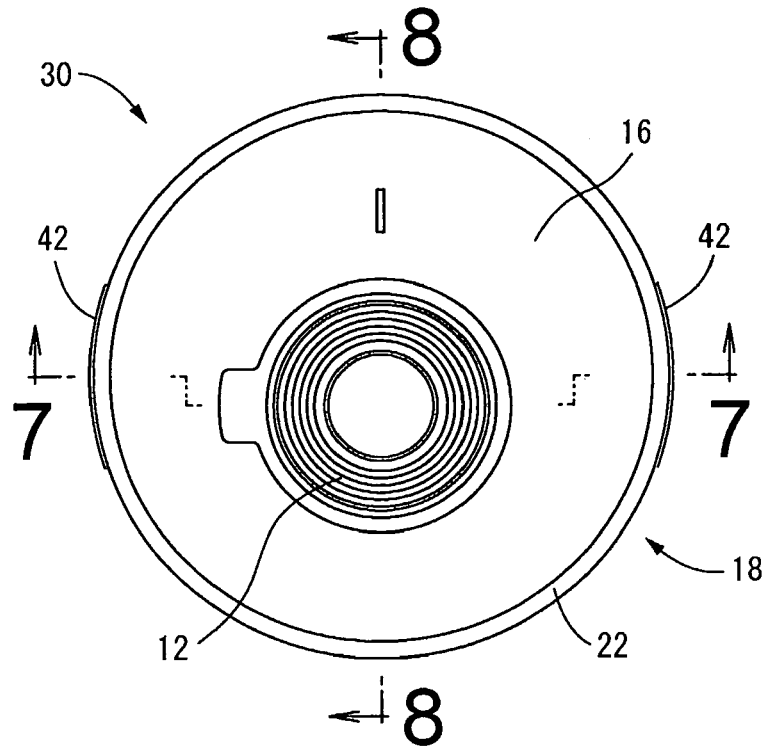
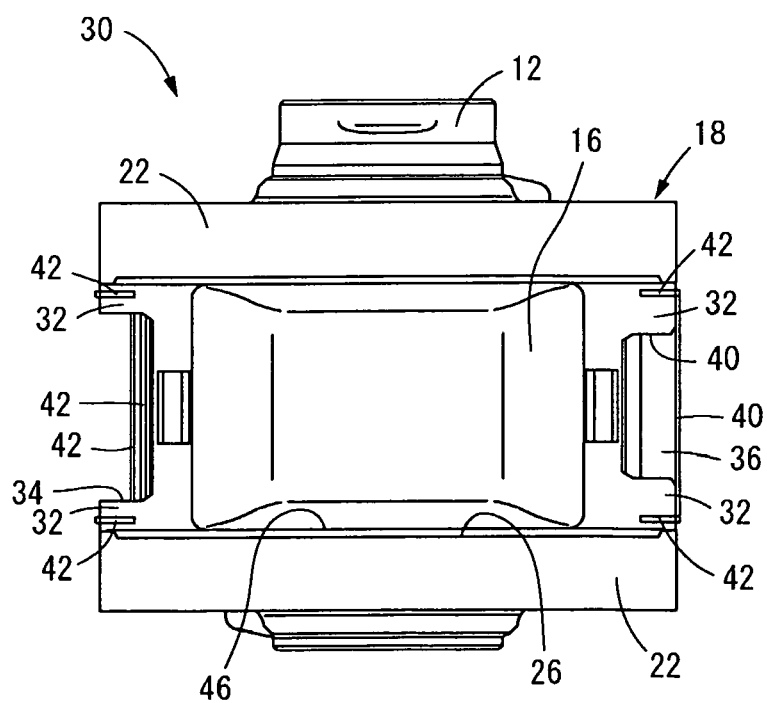

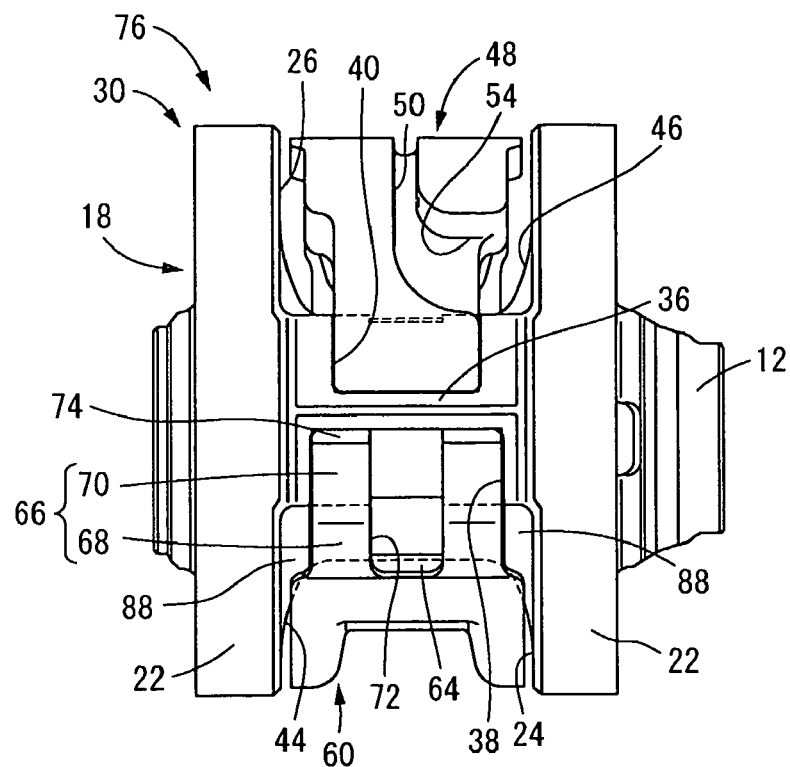
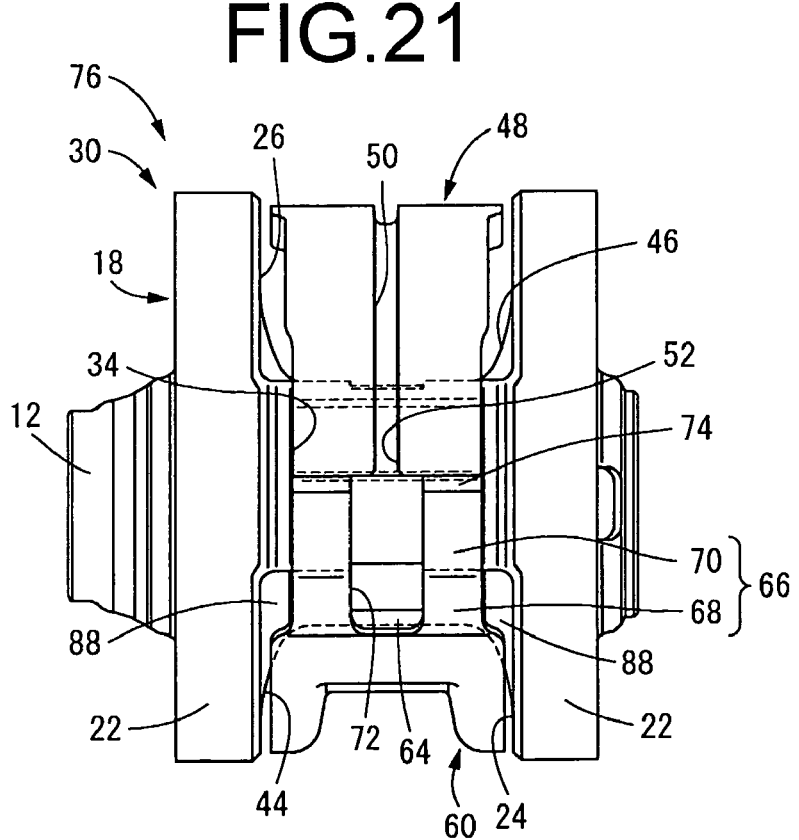

FLUID FILLED TYPE CYLINDRICAL VIBRATION DAMPING DEVICE

INCORPORATED BY REFERENCE

The disclosure of Japanese Patent Application No. 2008-017230 filed on Jan. 29, 2008, including the specification, drawings and abstract are incorporated herein by reference in their entirety.

BACKGROUND OF THE INVENTION

1. Field of the Invention

The present invention relates to a cylindrical vibration damping device of fluid filled type having a plurality of fluid chambers filled with a non-compressible fluid and intercommunicating through an orifice passage, the device being adapted to provide vibration damping action on the basis of flow action, e.g. the resonance action, of fluid through the orifice passage.

2. Description of the Related Art

In the field of fluid filled type vibration damping devices that utilize vibration damping action based on the flow action of a non-compressible fluid filling the interior, one type of device known to date is a cylindrical vibration damping device of fluid filled type as disclosed for example in U.S. Pat. No. 7,275,738 or in U.S. Unexamined Patent Publication No. US-A-2007273076. In these fluid filled type cylindrical vibration damping devices, an inner shaft fitting and a intermediate sleeve are positioned spaced apart from one another in the diametrical direction and linked by a main rubber elastic body; and an outer tubular member is slipped onto the outside of the intermediate sleeve and affixed fitting thereon. A first and a second pocket portion whose openings are formed through a first and second window portion made in the intermediate sleeve are covered by the outer tubular member, thereby defining a first and a second fluid chamber that are filled with a non-compressible fluid and give rise to relative pressure fluctuations when vibration is input. Further, an orifice passage is formed extending in the circumferential direction between the diametrically opposed faces of the intermediate sleeve and the outer tubular member, with the first and second fluid chamber communicating with one another through this orifice passage. With this design, when vibration is input across the inner shaft fitting and the outer tubular member causing elastic deformation of the main rubber elastic body, the pressure differential arising between the first fluid chamber and the second fluid chamber as a result will produce flow action, e.g. resonance action, of fluid through the orifice passage, thereby creating an orifice effect which is a type of vibration damping effect. Implementation of fluid filled type cylindrical vibration damping devices of this kind as automotive engine mounts, body mounts, diff mounts, suspension mounts and the like is a topic of ongoing research.

In some instances, a fluid filled type cylindrical vibration damping device of the sort described above will be provided with a stopper member attached between the diametrically opposed faces of the inner shaft fitting and the outer tubular member, with the object of preventing excessive displacement of the inner shaft fitting and the outer tubular member in association with input of large-amplitude vibration. The stopper member typically has an arcuate shape extending in the circumferential direction and spanning the first or second window portion between the intermediate sleeve and the outer tubular member, with the circumferentially center section of the stopper member juxtaposed against the outer tubular member, and with the circumferential end portions of the stopper member fitted between the diametrically opposed faces of the outer tubular member and the intermediate sleeve between the first and second window portions in the circumferential direction so that the circumferential center section of the stopper member is attached projecting out towards the inner shaft fitting from the outer tubular member. When excessive vibration is input across the inner shaft fitting and the outer tubular member, the inner shaft fitting and the outer tubular member will come into contact via the intervening stopper member, thereby limiting relative displacement of the two fittings.

In a fluid filled type cylindrical vibration damping device of conventional design equipped with such a stopper member, since the sections where the circumferential ends of the stopper member are attached and supported will overlap the openings of the orifice passage into the fluid chambers, it is difficult to ensure that the orifice passage has an adequate passage cross sectional area and opening area. This has tended to impose limitations on freedom of tuning through appropriate selection of the length and cross sectional area of the orifice passage, resulting in a possible inability to consistently achieve the intended orifice effect.

To cope with this problem, it would be conceivable, for example, to position the circumferential ends of the stopper member at locations away from the diametrically opposed faces of the outer tubular member and the intermediate sleeve between the first and second window portions in the circumferential direction, or to design the stopper member using the inside peripheral section of the outer tubular member. However, considerations such as the stability and ease of assembly of the stopper member with the outer tubular member or intermediate sleeve, the level of strength required of the stopper, and so on make such approaches impractical.

SUMMARY OF THE INVENTION

It is therefore one object of this invention to provide a fluid filled type cylindrical vibration damping device of novel structure, which is able to ensure a support structure by means of an intermediate sleeve for supporting the circumferential ends of the stopper member, while at the same time ensuring that the orifice passage has an adequate passage cross sectional area and opening area at the openings of the orifice passage into the fluid chambers, thereby effectively affording both stopper capability and orifice effect.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A principle of the present invention provides a fluid filled type cylindrical vibration damping device including: an integrally vulcanization molded component having an inner shaft member, an intermediate sleeve spaced apart peripherally outward from the inner shaft member, and a main rubber elastic body elastically connecting the inner shaft member and the intermediate sleeve; and an outer tubular member that is slipped externally onto the integrally vulcanization molded component to be affixed to the intermediate sleeve; a first and a second pocket portion formed in the main rubber elastic body and opening onto an outside peripheral face of the integrally vulcanization molded component through a first and a second window portion formed in the intermediate sleeve; a first fluid chamber and a second fluid chamber defined to either side of the inner shaft member in the axis-perpendicular direction by the first and second window portions being covered by the outer tubular member; and an orifice passage formed connecting the first fluid chamber and a second fluid chamber; a stopper member of arcuate plate shape being disposed extending spanning the first window portion in the circumferential direction, with two circumferential ends of the stopper member supported at two circumferential edges of the first window portion in the intermediate sleeve, and an elastic projection formed extending from at least one of opposed faces of the inner shaft member and the stopper member towards another within the first fluid chamber so that the stopper member and the elastic projection constitute a stopper mechanism in the axis-perpendicular direction; a communication passage that extends in the circumferential direction between the intermediate sleeve and the outer tubular member and connects the first window portion with the second window portion being formed at least one circumferential end sides of the first window portion, with a broad mating groove being formed in the communication passage at an end thereof on a first window portion side, and the corresponding circumferential end of the stopper member being supported fitted within the mating groove. The corresponding circumferential end of the stopper member is formed as a mating element having arcuate plate shape smaller in diameter than a circumferentially center section of the stopper member, the circumferential center section of the stopper member that constitutes the stopper mechanism is juxtaposed against and supported on the outer tubular member, while the mating element disposed at the circumferential end of the stopper member is juxtaposed against and supported on a bottom face of the mating groove in the communication passage, in order to form the communication passage along an entire area between diametrically opposed faces of the mating element and the outer tubular member. A cutout portion is formed extending in a circumferential direction from a circumferential end in a widthwise medial section of the mating element, with the communication passage opening into and communicating with the first fluid chamber at a distal end section of the cutout portion situated in the widthwise medial section of the mating element, and at two widthwise side sections of the mating element, respectively, thereby defining the orifice passage that connects the first fluid chamber with the second fluid chamber.

In the fluid filled type cylindrical vibration damping device of the above design according to the present invention, the mating element disposed at the corresponding or each circumferential end of the stopper member fits into and is supported within a mating groove that has been formed between the intermediate sleeve and the outer tubular member, thereby ensuring stable support of the stopper member on the outer tubular member and the intermediate sleeve. Thus, when excessive vibration has been input across the inner shaft member and the outer tubular member, the inner shaft member and the outer tubular member will come into stable contact via the interposed stopper member so that stopper performance is exhibited effectively.

In particular, by giving the mating element an arcuate plate shape smaller in diameter than the circumferential center section of the stopper member, and supporting it juxtaposed against the bottom face of the mating groove, the communication passage will be formed throughout between the diametrically opposed faces of the mating element and the outer tubular member. With this structure, since the orifice passage incorporates the communication passage, it is possible to ensure adequate passage cross sectional area of the orifice passage, even in the section where the orifice passage overlaps the circumferential end of the stopper member.

Moreover, by forming the cutout portion in the widthwise medial section of the broad mating element, the distal end section of the cutout portion and the two widthwise side sections of the mating element will define an opening section through which the communication passage opens into and communicates with the first fluid chamber. This arrangement ensures adequate opening area of the opening section of the orifice passage into the first fluid chamber, even in the section overlapping the stopper member.

For this reason, it is possible to ensure a stable support structure for the circumferential ends of the stopper member by the integrally vulcanization molded component, while also ensuring adequate opening area and cross sectional area of the orifice passage so as to afford sufficient freedom in tuning of the orifice passage, and as a result to effectively attain both stopper performance and orifice effect.

In one preferred mode of the fluid filled type cylindrical vibration damping device according to the invention, a circumferential end edge of the stopper member curves peripherally outward to form a contact portion, and this contact portion is then disposed in contact against the circumferential end face of the mating groove in the communication passage, to position the stopper member in the circumferential direction with respect to the integrally vulcanization molded component. By employing such a design, the stability of support of the stopper member by the outer tubular member and the intermediate sleeve may be improved, and stopper performance may be improved further. In particular, by forming the communication passage between the diametrically opposed faces of the outer tubular member and the circumferential end of the stopper member, it is a simple matter to ensure sufficient diametrical dimension on the part of the contact portion, and to thereby achieve further improvement in stopper performance based on sufficient contact area of the contact portion against the circumferential end face of the mating groove which has been ensured thereby.

In another preferred mode of the fluid filled type cylindrical vibration damping device according to the invention, an axial widthwise dimension of the communication passage in the mating groove is smaller than the axial widthwise dimension of the first window portion. By employing such a design, at either side in the width direction (axial direction) of the mating element of the stopper member that extends into the first window portion from the communication passage, it is a simple matter for the communication passage to open into and communicate with the first fluid chamber.

In yet another preferred mode of the fluid filled type cylindrical vibration damping device according to the invention, the axial widthwise dimension of the mating element is smaller than the axial widthwise dimension of the stopper member in its circumferentially medial section. By employing such a design, it is possible, while effectively ensuring an opening section for the communication passage into the first fluid chamber, to also achieve a positioning action of the circumferentially medial portion of the stopper member in the axial direction into the first window portion, and a positioning action of the mating element of the stopper member in the axial direction into the mating groove, and to thereby attain further improvement in stability of support of the stopper member on the integrally vulcanization molded component.

In yet another preferred mode of the fluid filled type cylindrical vibration damping device according to the invention, an orifice member is attached in the second window portion situated opposite from the stopper member in an axis-perpendicular direction with the inner shaft member interposed therebetween; and a fluid passage communicating at one end with the second fluid chamber and communicating at another end with the communication passage is formed between an outside peripheral face of the orifice member and the outer tubular member so as to define the orifice passage by the communication passage and the fluid passage. This will afford enhanced freedom in tuning of the resonance frequency of fluid flowing through the orifice passage.

In yet another preferable mode of the fluid filled type cylindrical vibration damping device according to the above mode, the orifice member constitutes another stopper mechanism situated opposite from the stopper member in an axis-perpendicular direction with the inner shaft member interposed therebetween. With this arrangement, a pair of stopper mechanisms is positioned in an axis-perpendicular direction of the inner shaft member and the outer tubular member, thereby doubling the stopper action.

In yet another preferable mode of the fluid filled type cylindrical vibration damping device according to the invention, the communication passage is formed exclusively to one circumferential end side of the first window portion; a support recess for receiving the end of the stopper member is formed to another circumferential end side of the first window portion; and mating elements of respectively identical shape are formed at the two circumferential ends of the stopper member, giving the stopper member as a whole symmetrical shape in the circumferential direction. With such a design, dissimilarity of the two circumferential sides of the stopper member will not be a problem, thus making it possible to completely prevent incorrect assembly of the circumferential ends of the stopper member into the mating groove and the support recess respectively.

In yet another preferred mode of the fluid filled type cylindrical vibration damping device according to the invention, the stopper portion comprises a center projection of hollow trapezoidal shape projecting inward is formed in a circumferentially center section of the stopper member. Where such a design is employed, in addition to affording improved freedom of tuning of stopper performance depending on the projecting height of the center projection, by giving the center projection a hollow trapezoidal shape it is possible to reduce the volume of the stopper member, and to thereby attain lighter weight and lower cost. Further, by giving the center projection a curving portion when forming it on the stopper member, reinforcing action of the stopper portion may be achieved, and stopper load bearing ability (stopper strength) may be improved further as a result.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 3 is a front elevational view of an integrally vulcanization molded component of the suspension bushing of FIG. 1;

FIG. 4 is a top plane view of the integrally vulcanization molded component of FIG. 3;

FIG. 20 is a right side view of an assembly wherein the orifice member and the stopper member are attached to the integrally vulcanization molded component; and FIG. 21 is a left side view of the assembly of FIG. 20.

DETAILED DESCRIPTION OF PREFERRED EMBODIMENTS

Figure 1:
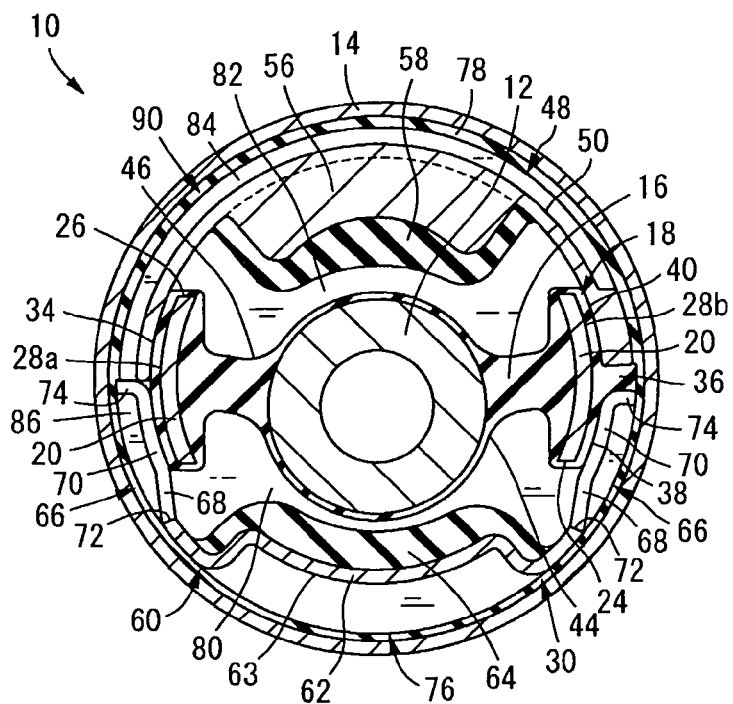
FIG. 1 is a transverse cross sectional view of a fluid filled type cylindrical vibration damping device in the form of an automotive suspension bushing according to one embodiment of the present invention, taken along line 1-1 of FIG. 2.
Figure 2:
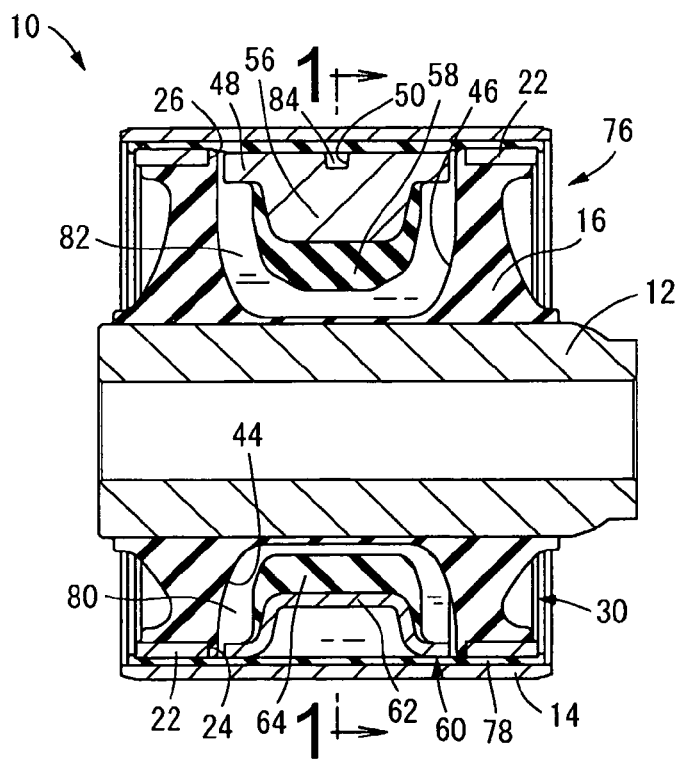
FIG. 2 is a vertical cross sectional view of the suspension bushing of FIG. 1.

Referring first to FIGS. 1 and 2, there is depicted a fluid filled type cylindrical vibration damping device in the form of an automotive suspension bushing 10 as a first embodiment according to the present invention. The automotive suspension bushing 10 has an inner shaft member 12 of metal and an outer tubular member 14 of metal, positioned spaced apart from one another by a prescribed distance in the diametrical direction and elastically linked to each other by a main rubber elastic body 16 disposed between them. The inner shaft member 12 is mounted onto the vehicle body (not shown), while the outer tubular member 14 is fastened to a suspension arm (not shown), thereby providing the suspension arm and the vehicle body with a vibration damping linkage via the suspension bushing 10.

The inner shaft member 12 and the outer tubular member 14 are positioned with slight eccentricity in a diametrical direction (in FIGS. 1 and 2, the vertical). With the device in the installed state, the main rubber elastic body 16 experiences elastic deformation under the weight of the suspension arm and the body so that the inner shaft member 12 and the outer tubular member 14 are positioned approximately concentrically. The principal vibrations targeted for damping is input in the direction of generally eccentricity of the inner shaft member 12 and the outer tubular member 14 (in FIGS. 1 and 2, the vertical).

To describe in detail, the inner shaft member 12 has a small-diameter, generally round tubular shape. As the intermediate sleeve, a metallic intermediate sleeve 18 of large-diameter, generally round tubular shape is disposed diametrically outward from the inner shaft member 12 and is positioned a prescribed distance away and with slight eccentricity from the inner shaft member 12.

The intermediate sleeve 18 is comparatively smaller in diameter at its axially medial section than at its end sections, giving it a stepped round tubular shape with a small-diameter tubular portion 20 at the center and large-diameter tubular portions 22, 22 at the ends. A first window portion 24 is provided to the intermediate sleeve 18 on the side thereof situated the shorter distance away from the inner shaft member 12 in the direction of eccentricity, while a second window portion 26 is provided on the side situated the longer distance away from the inner shaft member 12 in the direction of eccentricity. The first and second window portions 24, 26 each have generally oblong shape extending for a length slightly less than halfway about the circumference through the axially medial section of the intermediate sleeve 18. At locations spaced apart by prescribed distance in the circumferential direction, these first and second window portions 24, 26 perforate the connecting sections of the small-diameter tubular portion 20 with the large-diameter tubular portions 22 and the small-diameter tubular portion 20 in the intermediate sleeve 18, thereby defining in the circumferential direction between the first window portion 24 and the second window portion 26 of the intermediate sleeve 18, a pair of mating slots 28a, 28b that are defined by a trench of prescribed width in the axially medial section, that extends in the circumferential direction.

The main rubber elastic body 16, which has a generally tubular shape, is interposed between the diametrical opposed faces of the intermediate sleeve 18 and the inner shaft member 12, with the inside peripheral face of the main rubber elastic body 16 vulcanization bonded to the outside peripheral face of the inner shaft member 12 and with the outside peripheral face of the main rubber elastic body 16 vulcanization bonded to the inside peripheral face of the intermediate sleeve 18. This produces an integrally vulcanization molded component 30 like that depicted in FIGS. 3 to 9 in which the inner shaft member 12 and the intermediate sleeve 18 have been integrally vulcanization molded and are linked to each other by the main rubber elastic body 16.

Figure 5:
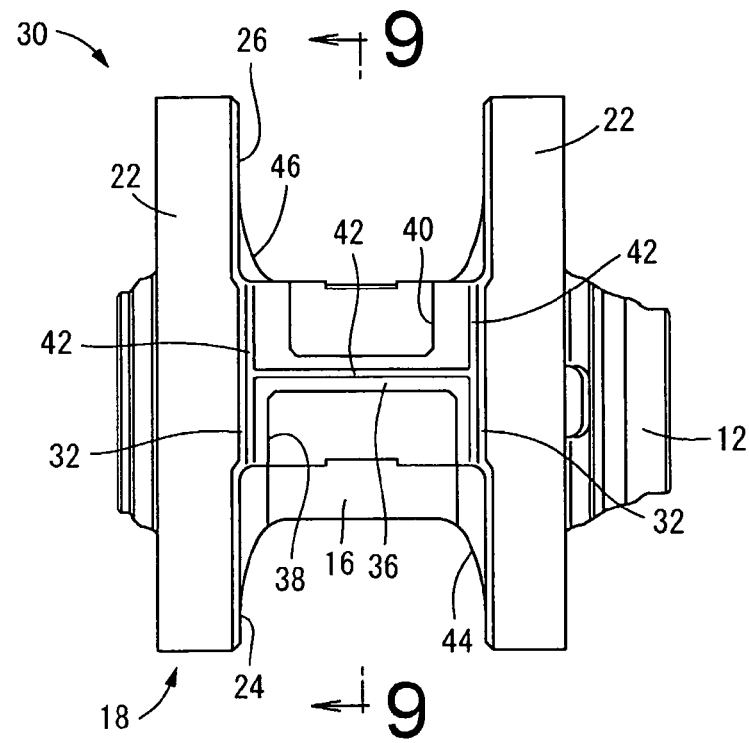
FIG. 5 is a right side view of the integrally vulcanization molded component of FIG. 3.
Figure 6:
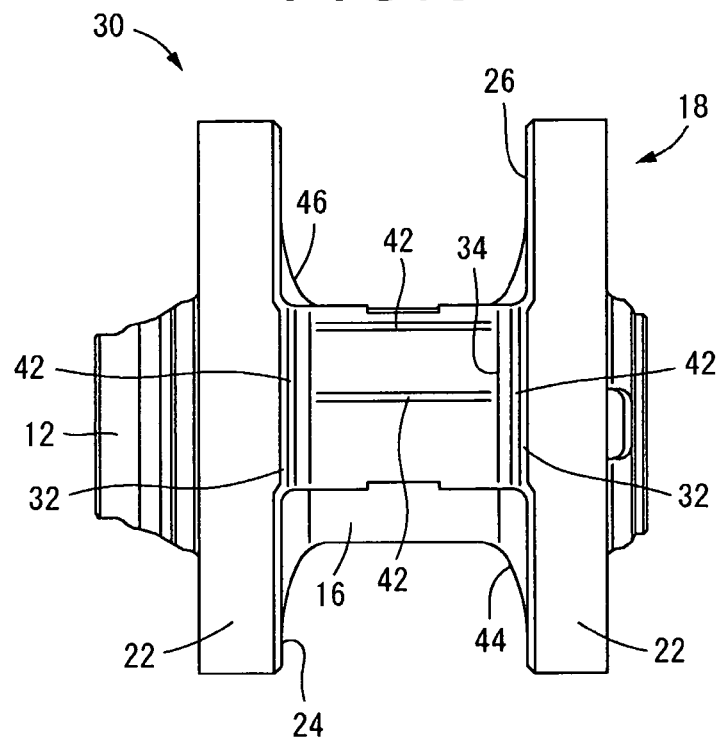
FIG. 6 is a left side view of the integrally vulcanization molded component of FIG. 3.
Figure 7:
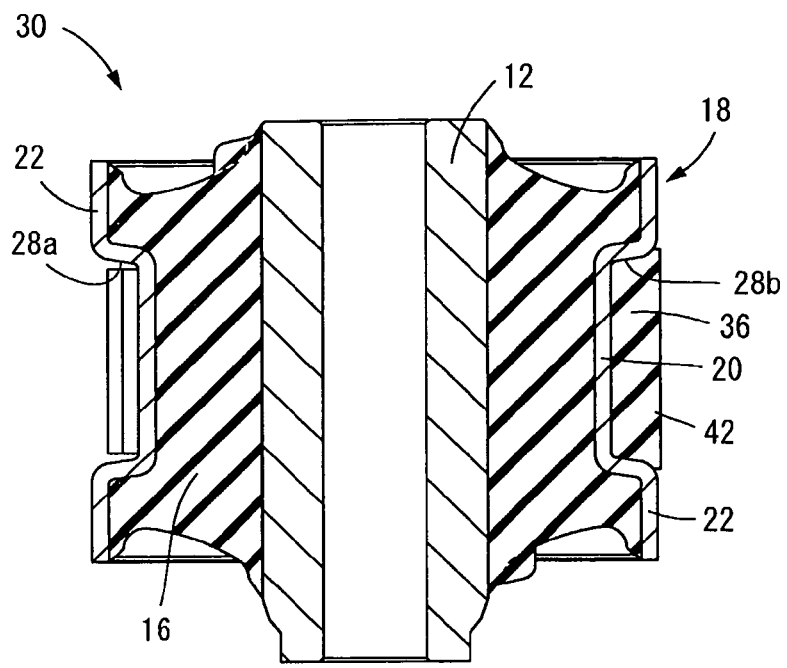
FIG. 7 is a cross sectional view taken along line 7-7 of FIG. 3.
Figure 8:
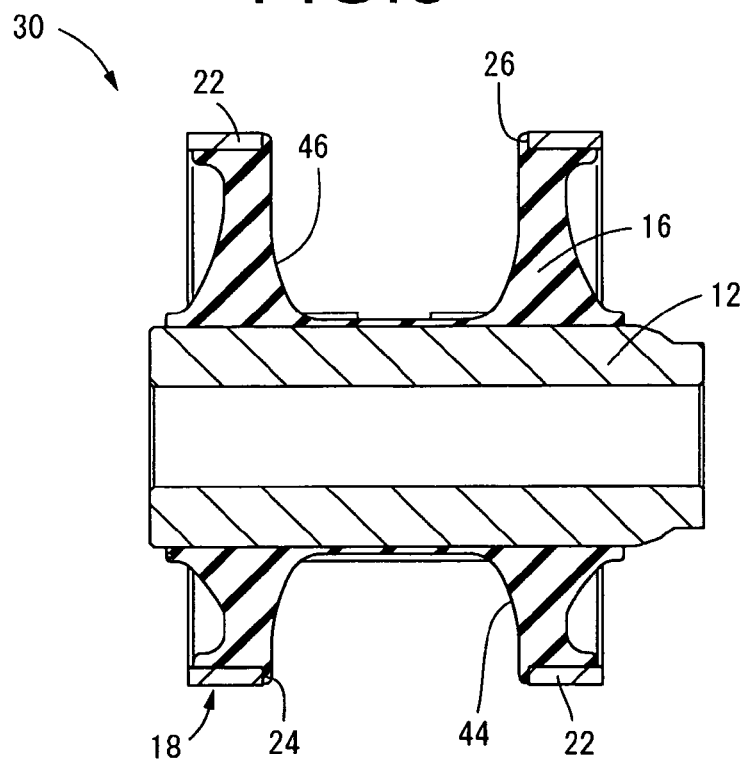
FIG. 8 is a cross sectional view taken along line 8-8 of FIG. 3.
Figure 9:
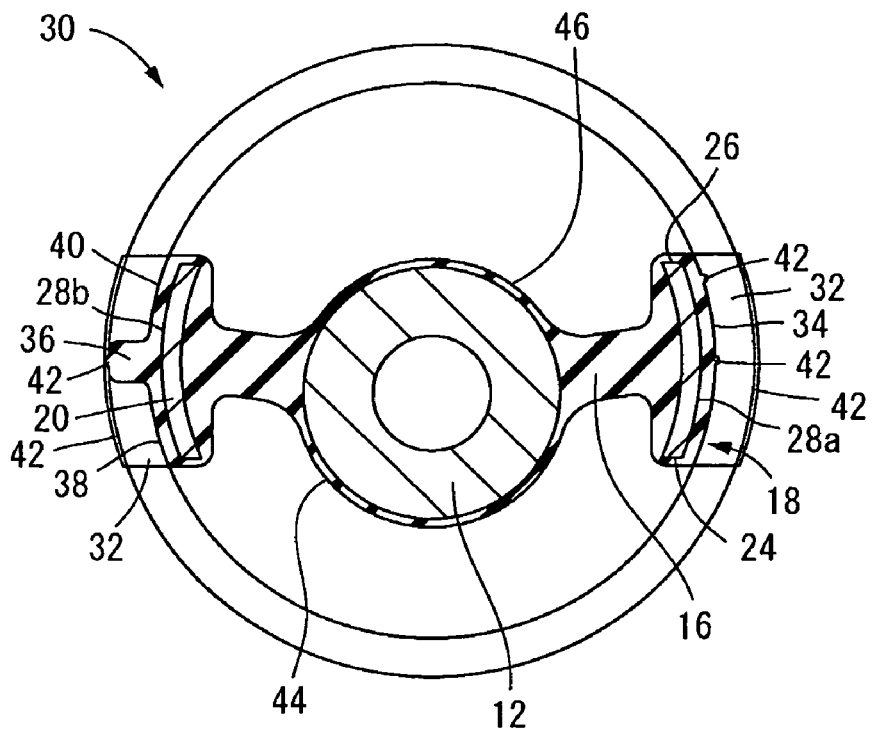
FIG. 9 is a cross sectional view taken along line 9-9 of FIG. 5.
Figure 10:
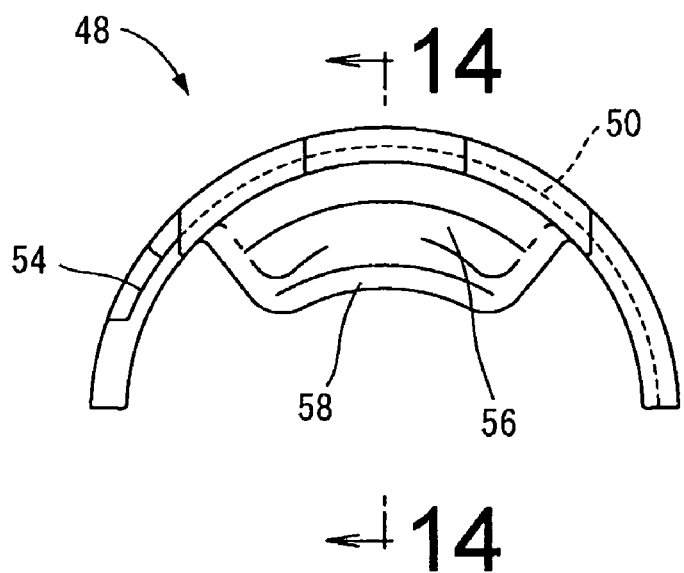
FIG. 10 is a rear side elevational view of an orifice member of the suspension bushing of FIG. 1.

In the integrally vulcanization molded component 30, a pair of mating rubbers 32, 32 are disposed within each of the mating slots 28a, 28b of the intermediate sleeve 18 so as to be situated on the side walls thereof in the width direction of the slot (at left and right in FIGS. 5 and 6). These mating rubbers 32, 32 are integrally formed with the main rubber elastic body 16, and they are situated in opposition spaced apart by a prescribed distance in the axial direction (width direction of the slot) so as to extend in the circumferential direction along the two widthwise side walls and project inward in the axial direction of the intermediate sleeve 18 (i.e. inward in the width direction of the slot from the two side walls).

The pair of mating rubbers 32, 32 in one mating slot 28a (the left one in FIG. 1) of the intermediate sleeve 18 cooperate to define a broad mating groove 34 that extends in the circumferential direction to the inside of the mating slot 28. The first window portion 24 and the second window portion 26 are connected by this mating groove 34.

In this embodiment in particular, a rubber partition 36 that is integrally formed with the main rubber elastic body 16 and with the mating rubbers 32 is disposed in the approximately center section in the circumferential direction of the other mating slot 28b (the right one in FIG. 1) of the intermediate sleeve 18. The rubber partition 36 extends in the axial direction with generally oblong cross section so as to project diametrically outward from the outside peripheral face of the small-diameter tubular portion 20, and connects at its axial ends to the mating rubbers 32, 32. The projecting distal end face of the rubber partition 36 (i.e. its outside peripheral face) is positioned at approximately the same diametrical height as the outside peripheral face of the mating rubbers 32. By forming this rubber partition 36 in the circumferential center section of the mating slot 28b, the inner zone of the mating slot 28b furnished with the pair of mating rubbers 32, 32 is bifurcated in the circumferential direction.

To one circumferential side (the lower side in FIGS. 1 and 5) of rubber partition 36 of the mating slot 28b, the axial inside peripheral face of the pair of mating rubbers 32, 32 and one circumferential end face of the rubber partition 36 cooperate to define a first support recess 38, as a recess for support purposes that opens with oblong concave contours towards the first window portion 24. To the other circumferential side (the upper side in FIGS. 1 and 5) of rubber partition 36 of the mating slot 28b, the axial inside peripheral face of the pair of mating rubbers 32, 32 and the other circumferential end face of the rubber partition 36 cooperate to define a second support recess 40 that opens with oblong concave contours towards the second window portion 26. In this embodiment in particular, the axial inside peripheral face of the mating rubbers 32 that define the axial side wall faces of the second support recess 40 is situated axially inward in relation to the axial inside peripheral face of the mating rubbers 32 that define the axial side wall faces of the first support recess 38, and based on this fact the axial widthwise dimension of the second support recess 40 is smaller than the axial widthwise dimension of the first support recess 38.

On the outside peripheral face of the small-diameter tubular portion 20 and the outside peripheral face of the mating rubbers 32 in the first mating slot 28a, and on the outside peripheral face of the rubber partition 36 and the outside peripheral face of the mating rubbers 32 in the other mating slot 28b, a number of seal lips 42 integrally formed with the main rubber elastic body 16 etc. extend respectively in the axial direction and the circumferential direction.

The main rubber elastic body 16 of the integrally vulcanization molded component 30 is further provided with a first pocket portion 44 and with a second pocket portion 46 with recessed contours having generally oblong shape when viewed in the axis-perpendicular direction. The first pocket portion 44 opens onto the outside peripheral face through the first window portion 24 of the intermediate sleeve 18, while the second pocket portion 46 opens onto the outside peripheral face through the second window portion 26 of the intermediate sleeve 18. An orifice member 48 is attached to this integrally vulcanization molded component 30.

As depicted in FIGS. 10 to 14, the orifice member 48 has a generally semicircular tube shape, and is constituted by cast molding made of metal material such as aluminum light alloy or iron. The orifice member 48 could also be a press-formed part, or made of rigid resin material such as polyphenylene sulfide (PPS) or polyamide (PA). In the approximate center section of the orifice member 48 in its axial direction, there is formed an orifice groove 50 that extends in the circumferential with a cross section that opens with recessed contours onto the outside peripheral face from the diametrically medial section. A circumferential communicating window 52 that opens onto a first circumferential end edge (the right one in FIGS. 10 to 12) of the orifice member 48 is formed at a first end of the orifice groove 50, while an axial communicating window 54 that deflects in the axial direction of the orifice member 48 (downward in FIG. 11) and opens onto a first axial end edge of the orifice member 48 is formed at the other end of the orifice groove 50. In this embodiment in particular, the orifice member 48 at its other circumferential end at which the axial communicating window 54 is located has an axial widthwise dimension that is smaller than the axial widthwise dimension at its other circumferential end at which the circumferential communicating window 52 is located. That is, the orifice member 48 has asymmetric shape in the circumferential direction.

A stopper portion 56 that projects diametrically inward with generally trapezoidal shape from the inside peripheral face is integrally formed in the circumferential center section of the orifice member 48. The projecting distal end face of the stopper portion 56 is covered by a cushioning rubber 58 made from a rubber elastic body. The cushioning rubber 58 serves as the elastic projection. The diametrical inside peripheral face of the stopper portion 56 (which is also its projecting distal end face) and the diametrical inside peripheral face of the cushioning rubber 58 curve in the circumferential direction with approximately the same curvature as the outside peripheral face of the orifice member 48. The diametrical inside peripheral face of the cushioning rubber 58 curves more gradually as compared with the diametrical inside peripheral face of the stopper portion 56.

This orifice member 48 is fitted into the second pocket portion 46 diametrically from outside the integrally vulcanization molded component 30 on its second pocket portion 46 side, and the first circumferential end of the orifice member 48 at which the circumferential communicating window 52 is disposed is inserted in the axial direction into the mating groove 34 of the first mating slot 28*a*, while the inside peripheral face of this first circumferential end of the orifice member 48 is juxtaposed against the bottom face of the mating groove 34 so as to extend to the circumferential center section from the end edge on the second window portion 26 side in the mating slot 28*a*. The other circumferential end of the orifice member 48 at which the axial communicating window 54 is located is inserted in the axial direction into the second support recess 40 of the other mating slot 28*b*, with the inside peripheral face of this other circumferential end of the orifice member 48 juxtaposed against the bottom face of the second support recess 40 and with the other circumferential end edge of the orifice member 48 juxtaposed in the circumferential direction against the rubber partition 36.

With this arrangement, the orifice member 48 is attached along the circumferential direction of the integrally vulcanization molded component 30 so as to fit within the second pocket portion 46 while circumferentially spanning the second window portion 26 of the intermediate sleeve 18 (see FIGS. 20 and 21). Additionally, the stopper portion 56 that has been formed in the circumferential center section of the orifice member 48 is positioned facing the inner shaft member 12 across a prescribed distance in the diametrical direction to the inside of the second pocket portion 46. Positioning of the orifice member 48 in the axial direction with respect to the integrally vulcanization molded component 30 may be accomplished by fitting the circumferential ends of the orifice member 48 into the mating groove 34 and into the second support recess 40 respectively; while positioning of the orifice member 48 in the circumferential direction with respect to the integrally vulcanization molded component 30 may be accomplished by juxtaposing the first circumferential end edge of the orifice member 48 against a contact portion 74 of a stopper member 60 (discussed later), and juxtaposing the other circumferential end edge of the orifice member 48 against the rubber partition 36.

The stopper member 60 is also attached to the integrally vulcanization molded component 30. As depicted in FIGS. 15 to 19, the stopper member 60 has a generally semicircular tube shape constituted by press-formed article made of metal material such as pressed sheet steel. It is also acceptable to use a cast article of aluminum light alloy or the like, or a hard resin material such as polyamide (PA) etc.

A stopper portion 62 that projects diametrically inward with generally trapezoidal shape from the inside peripheral face has been integrally formed in the circumferential center section of the stopper member 60. In this embodiment in particular, owing to the fact that pressed sheet steel of thin elongated, generally oblong flat-plate shape or semicircular tube shape has been subjected to a pressing process such as drawing or bending thereby producing a center recess 63 having generally trapezoidal shape from the outside towards the inside in the diametrical direction, the stopper portion 62 projects towards the inside peripheral side, and thus the stopper portion 62 is defined by a center projection of hollow trapezoidal shape that projects to the inside peripheral side of the stopper member 60. The stopper portion 62 curves in the circumferential direction with approximately the same curvature as does the outside peripheral face of the stopper member 60 that contacts the basal end sections of the stopper portion 62, and extends a prescribed distance in the circumferential direction (e.g. for one-fourth to two-thirds the circumferential length of the stopper member 60) in the circumferential center of the stopper member 60. The inside peripheral face of the stopper portion 62 is covered by a cushioning rubber 64 made from a rubber elastic body. The cushioning rubber 64 serves as the elastic projection. The diametrical inside peripheral face of the cushioning rubber 64, which is also its projecting distal end face, curves in the circumferential direction with approximately the same curvature as does the stopper portion 62. A rubber elastic body having self-lubricating qualities is preferred for use as the cushioning rubber 64 and as the cushioning rubber 58 disposed on the orifice member 48 discussed earlier.

Here, mating elements 66 have been formed on the circumferential ends of the stopper member 60. The design of the mating element 66 incorporates a shoulder portion 68 and a curving portion 70.

The shoulder portion 68 has an inclined plate shape that inclines diametrically inward going circumferentially outward from a location a prescribed distance circumferentially outward from the stopper portion 62 in the stopper member 60.

The curving portion 70 has a curving plate shape extending in the circumferential direction towards the circumferential end edge of the stopper member 60 from the circumferentially outward end edge of the shoulder portion 68, and curves in the circumferential direction with approximately the same curvature as does the stopper portion 62 and the section of the stopper member 60 that is located between the stopper portion 62 and the shoulder portion 68.

The axial widthwise dimension of the mating element 66 incorporating the shoulder portion 68 and the curving portion 70 is smaller than the axial widthwise dimension of the stopper member 60 in the circumferentially medial section thereof where the stopper portion 62 is disposed. A cutout portion 72 is formed in the center section of the mating element 66 in the axial direction (width direction).

The cutout portion 72 extends with generally unchanging axial widthwise dimension in the circumferential direction from the circumferential end of the mating element 66, and at its circumferentially outward end opens onto the circumferentially outward end edge of the curving portion 70, while its circumferentially inward end is positioned at approximately the same location in the circumferential direction as the circumferentially inward basal end section of the shoulder portion 68. The mating element 66 thereby extends with forked form circumferentially outward at the circumferential end of the stopper member 60.

The contact portion 74 is formed at the circumferentially outward end edge of the curving portion 70 in the mating element 66, which is also the circumferential end edge of the stopper member 60. The contact portion 74 is of small plate shape extending in a generally straight line diametrically outward from the circumferential end edge of the curving portion 70. Since the cutout portion 72 extends in the circumferential direction through the axial center section of the contact portion 74 and opens onto the projecting distal end face, the contact portion 74 is divided in two in the axial direction. The projecting distal end section (face) of the contact portion 74 is positioned approximately on the circumference of a circle of curvature defining the outside peripheral face of the stopper member 60.

That is, at each circumferential end of the stopper member 60 having the above structure, the mating element 66 and the contact portion 74 cooperatively open diametrically outward with recessed contours. As will be apparent from the above description, the stopper portion 62 is formed in the circumferential center section of the stopper member 60, while the identically shaped pair of mating elements 66, the cutout portions 72, and the contact portions 74 are formed at the circumferential ends, giving the stopper member 60 as a whole a symmetric shape in the circumferential direction.

This stopper member 60 is fitted into the first pocket portion 44 diametrically from outside the integrally vulcanization molded component 30 on its first pocket portion 44 side, and the curving portion 70 of the mating element 66 situated at a first circumferential end (the left in FIG. 1) of the stopper member 60 is fitted in the axial direction into the mating groove 34 of the first mating slot 28a of the intermediate sleeve 18, while juxtaposing the inside peripheral face of this curving portion 70 against the bottom face of the mating groove 34 so as to extend from the end edge on the first window portion 24 side to the circumferential center section within the mating slot 28a. Also, the circumferentially outward end face of the contact portion 74 on this first circumferential side is juxtaposed in the circumferential direction against a first circumferential end face of the orifice member 48 on the side thereof at which the circumferential communicating window 52 is situated. Further, the curving portion 70 of the mating element 66 situated at the other circumferential side (the right side in FIG. 1) of the stopper member 60 is fitted in the axial direction into the first support recess 38 of the other mating slot 28b, with the inside peripheral face of this curving portion 70 juxtaposed against the bottom face of the first support recess 38. Also, the circumferentially outward end face of this contact portion 74 on the other circumferential side is juxtaposed in the circumferential direction against the circumferential end face of the rubber partition 36.

With this arrangement, as depicted in FIGS. 20 and 21, the stopper member 60 is attached along the circumferential direction of the integrally vulcanization molded component 30 so as to fit within the first pocket portion 44 and span the first window portion 24 of the intermediate sleeve 18 in the circumferential direction. The stopper portion 62 of the stopper member 60 is positioned facing, from across a prescribed distance in the diametrical direction, the inner shaft member 12 which is situated at the inside of the first pocket portion 44. Positioning of the stopper member 60 in the axial direction with respect to the integrally vulcanization molded component 30 may be accomplished through fitting of the mating elements 66, 66 at the circumferential ends of the stopper member 60 into the mating groove 34 of the intermediate sleeve 18 and into the first support recess 38 respectively. Positioning of the stopper member 60 in the circumferential direction with respect to the integrally vulcanization molded component 30 may be accomplished through juxtaposition of the circumferential end face of the contact portion 74 at one circumferential side of the stopper member 60 against a first circumferential end face of the orifice member 48 on the side thereof at which the circumferential communicating window 52 is disposed, while juxtaposing the circumferential end face of the contact portion 74 at the other circumferential side of the stopper member 60 against the circumferential end face of the rubber partition 36.

The outer tubular member 14 is now attached to an assembly 76 resulting from attachment of the orifice member 48 and the stopper member 60 to the integrally vulcanization molded component 30 in the above manner. The outer tubular member 14 has a large-diameter, generally round tubular shape, and is made of an iron based material etc. that is deformable to reduced diameter in the diametrical direction. The inside peripheral face of the outer tubular member 14 is covered entirely by a thin seal rubber layer 78.

The outer tubular member 14 is slipped about the exterior of the assembly 76, and the outer tubular member 14 is then subjected to a diameter reduction process such as 360-degree radial compression i.e. radially inward drawings using eight dies, whereby the outer tubular member 14 deforms to smaller diameter and the outer tubular member 14 becomes juxtaposed, via the intervening seal rubber layer 78, against the large-diameter tubular portions 22 of the intermediate sleeve 18 of the integrally vulcanization molded component 30, the orifice member 48, and the stopper member 60. With this arrangement, the outer tubular member 14 is affixed fitting onto the assembly 76, and is elastically connected to the inner shaft member 12 via the main rubber elastic body 16. Also, the first pocket portion 44 and the second pocket portion 46 are covered fluid tightly by the outer tubular member 14 via the intervening seal rubber layer 78.

Between the diametrically opposed faces of the inner shaft member 12 and the outer tubular member 14, there is formed on the side situated the shorter distance away in the direction of eccentricity (the lower side in FIGS. 1 and 2) a first fluid chamber 80 that is defined by the first pocket portion 44 and the outer tubular member 14, while on the side situated the longer distance away in the direction of eccentricity (the upper side in FIGS. 1 and 2) there is formed a second fluid chamber 82 that is defined by the second pocket portion 46 and the outer tubular member 14. These first fluid chamber 80 and second fluid chamber 82 are filled with a non-compressible fluid. As the sealed non-compressible fluid it would be possible to use, for example, water, an alkylene glycol, a polyalkylene glycol, silicone oil, or the like. In order to effectively achieve vibration damping effect based on flow action such as resonance action of the fluid, it will be especially preferable to use a low-viscosity fluid having viscosity of 0.1 Pa·s or lower. The walls of the first and second fluid chambers 80, 82 are each partly defined by the main rubber elastic body 16. Elastic deformation of the main rubber elastic body 16 due to relative displacement of the inner shaft member 12 and the outer tubular member 14 will give rise to pressure fluctuations in the first and second fluid chambers 80, 82.

In this embodiment, the first and second fluid chambers 80, 82 are filled with the non-compressible fluid by assembling the assembly 76 and the outer tubular member 14 while these components are submerged in the non-compressible fluid. With this arrangement, the space between the diametrical opposed faces of the outer tubular member 14 and the center recess 63 of the stopper member 60 is filled with the non-compressible fluid as well. However, as this non-compressible fluid has no direct relation to resonance action of fluid through an orifice passage 90 (discussed later), it would be possible to make hole in the section of the outer tubular member 14 covering the center recess 63 and to then drain the non-compressible fluid from the center recess 63 through this hole, for example. That is, it is not necessary for the center recess 63 to be filled with non-compressible fluid. In this case, the fluid tightness of the fluid filled areas such as the first and second fluid chambers 80, 82 shall be maintained.

In association with attachment of the outer tubular member 14 to the assembly 76, the seal lips 42 which project from the outside peripheral face of the mating rubbers 32 and the rubber partition 36 in the integrally vulcanization molded component 30 experience compressive deformation in the diametrical direction between the outer tubular member 14 and the assembly 76 so as to come into intimate contact against the seal rubber layer 78 of the outer tubular member 14. Also, the opening of the orifice groove 50 in the orifice member 48 is covered by the outer tubular member 14, thereby forming a fluid passage 84. A first end of the fluid passage 84 connects with the second fluid chamber 82 through the axial communicating window 54 of the orifice member 48.

The stopper portion 62 of the stopper member 60 is positioned to the first fluid chamber 80 side of the inner shaft member 12 in the direction of eccentricity of the eccentrically positioned inner shaft member 12 and outer tubular member 14, and is situated facing and spaced apart by a prescribed distance from the inner shaft member 12. While the stopper portion 56 of the orifice member 48 is positioned to the second fluid chamber 82 side of the inner shaft member 12, and is situated facing and spaced apart by a prescribed distance from the inner shaft member 12. With this arrangement, with the device installed in an automobile, there are constituted axis-perpendicular direction stopper mechanisms which, in the event of excessive vibration input in the direction of eccentricity of the inner shaft member 12 and outer tubular member 14, will provide cushioned limitation of the extent of displacement of the inner shaft member 12 and the outer tubular member 14 due to the inner shaft member 12 and the outer tubular member 14 coming into contact with one another via the intervening stopper portion 62 and cushioning rubber 64 of the stopper member 60, or to their coming into contact with one another via the intervening stopper portion 56 and cushioning rubber 58 of the orifice member 48. That is, in this embodiment, stopper mechanisms are provided to both sides of the inner shaft member 12 in the axis-perpendicular direction. Moreover, in this embodiment, while the circumferential center section of the stopper member 60 is juxtaposed against the inside peripheral face side of the outer tubular member 14, its two ends in the width direction (left and right in FIGS. 2, 18, and 19) are juxtaposed directly against the outer tubular member 14, while at its widthwise center section, the section that is juxtaposed against the outer tubular member 14 has a gapped structure owing to the presence of the center recess 63.

When attaching the outer tubular member 14 to the assembly 76, the basal end section of the stopper portion 62 situated in the circumferential center section of the stopper member 60 and the projecting distal end sections of the contact portions 74 situated at the circumferential end edges of the stopper member 60 is juxtaposed against the outer tubular member 14 via the intervening seal rubber layer 78, while the curving portions 70 of the mating elements 66 is juxtaposed against the intermediate sleeve 18 side. Based thereon, a gap will form between the diametrically opposed faces of the outer tubular member 14 and the mating elements 66 having generally arcuate plate shape of smaller diameter than the circumferential center section of the stopper member 60.

A communication passage 86 is formed due to the presence of the gap which extends throughout between the diametrically opposed faces of the outer tubular member 14 and the mating elements 66 which have been fitted into the mating groove 34. A first end of this communication passage 86 connects to the circumferential communicating window 52 of the orifice member 48 situated at the other end of the fluid passage 84.

Further, in a zone circumferentially between the mating groove 34 of the integrally vulcanization molded component 30 and the stopper portion 62 of the stopper member 60, the shoulder portion 68 of the mating element 66 will face towards the first fluid chamber 80, and the distal end portion of the cutout portion 72 which extends in the circumferential direction from the curving portion 70 towards the shoulder portion 68 of the mating element 66 will open into the first fluid chamber 80. Furthermore, as the axial widthwise dimension of the mating element 66 is smaller than the axial widthwise dimension of the first window portion 24, a gap 88 is formed between the axial or widthwise ends of the mating element 66 and the edge portion of the first window portion 24 (see FIG. 21), with the communication passage 86 and the first fluid chamber 80 communicating through this gap 88. That is, the communication passage 86 connects at its other end to the first fluid chamber 80 through the distal end portion of the cutout portion 72 and through the pair of gaps 88, 88 situated at the widthwise side sections of the mating element 66.

In this embodiment, the orifice passage 90 incorporates the communication passage 86 and the fluid passage 84. The first fluid chamber 80 and the second fluid chamber 82 thereby communicate with one another through the orifice passage 90, thus allowing flow of fluid between the two chambers 80, 82 through the orifice passage 90. Through appropriate design modification of the passage length and passage cross sectional area of the orifice passage 90, the resonance frequency of fluid flowing through the orifice passage 90 can be tuned so as to afford effective vibration damping action (high attenuating action) of problematic vibrations targeted for damping.

Moreover, in this embodiment, like the communication passage 86, the gap that has been formed throughout between the diametrically opposed faces of the outer tubular member 14 and the mating element 66 affixed fitting into the first support recess 38 is filled with non-compressible fluid, and connects with the first fluid chamber 80 through the distal end section of the cutout portion 72 and through the pair of gaps 88, 88 that are situated at the widthwise side sections of the mating element 66. Since the cutout portion 72 is closed off at its circumferential end by the rubber partition 36, the gap between the diametrically opposed faces of this mating element 66 and the outer tubular member 14 will function as a sealed fluid chamber, with this gap partly defining the first fluid chamber 80.

In the automotive suspension bushing 10 having the structure described above, the pair of mating elements 66, 66 that have been disposed at the circumferential ends of the stopper member 60 are supported fitting respectively into the mating groove 34 and the first support recess 38 of the integrally vulcanization molded component 30, thereby improving stability of attachment of the stopper member 60. In this embodiment in particular, the contact portion 74 formed at each circumferential end edge of the stopper member 60 is juxtaposed against a circumferential end of the orifice member 48 either directly or via the intervening rubber partition 36, thereby reliably positioning the stopper member 60 in the circumferential direction with respect to the assembly 76 and improving the load bearing ability of the stopper member 60 by utilizing the strength of the orifice member 48. Effective stopper performance will be afforded thereby, when functioning as a stopper mechanism in the axis-perpendicular direction.

The orifice passage 90 is constituted in part by the communication passage 86. Since the communication passage 86 is formed throughout between the diametrically opposed faces of the outer tubular member 14 and the axially broad mating element 66, sufficient passage cross sectional area of the orifice passage 90 will be assured, even in the section where the orifice passage 90 overlaps the stopper member 60.

Moreover, the opening section of the orifice passage 90 into the first fluid chamber 80 incorporates the cutout portion 72 that has been formed in the widthwise medial section of the axially broad mating element 66 and the gaps 88, 88 situated to either widthwise side section of the mating element 66. Thus, sufficient opening area of the opening section of the orifice passage 90 in the first fluid chamber 80 will be assured, even in the section where the orifice passage 90 overlaps the stopper member 60.

For this reason, the automotive suspension bushing of the embodiment will consistently ensure a stable support structure for the circumferential ends of the stopper member 60 on the integrally vulcanization molded component 30, while also ensuring ample passage cross sectional area and opening area of the orifice passage 90, so as to afford adequate freedom in tuning of the orifice passage 90, and as a result, consistent stopper effect and orifice effect.

In this embodiment in particular, because the stopper member 60 has mating elements 66 of identical shape formed at its circumferential ends giving it a circumferentially symmetric shape overall, the communication passage 86 will form regardless of which mating element 66 is fitted into the mating groove 34. This completely avoids the problem of improper attachment of the stopper member 60 to the integrally vulcanization molded component 30, and in addition to affording ample product consistency, affords improved manufacturing efficiency as well.

Moreover, in this embodiment, as the mating elements 66, 66 are formed at both circumferential ends of the stopper member 60, and despite a mating element 66 being formed on the side that does not define part of the communication passage 86, since the first fluid chamber 80 is partly defined by the gap between the diametrically opposed faces of this mating element 66 and the outer tubular member 14, improved freedom in design of the fluid chamber may be afforded with a smaller number of parts.

While the present invention has been described in detail herein in through one preferred embodiment, it is also to be understood that the present invention is in no way limited thereby and may be embodied with various changes, modifications and improvements which may occur to those skilled in the art, without departing from the spirit and scope of the invention.

Figure 11:
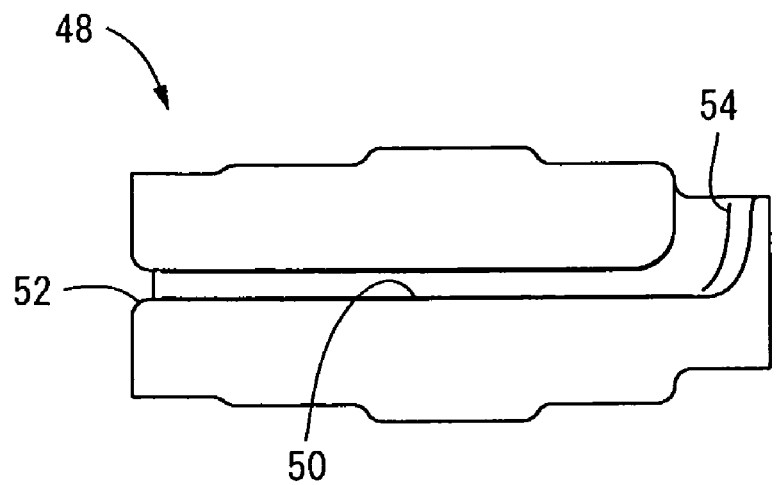
FIG. 11 is a top plane view of the orifice member of FIG. 10.
Figure 12:
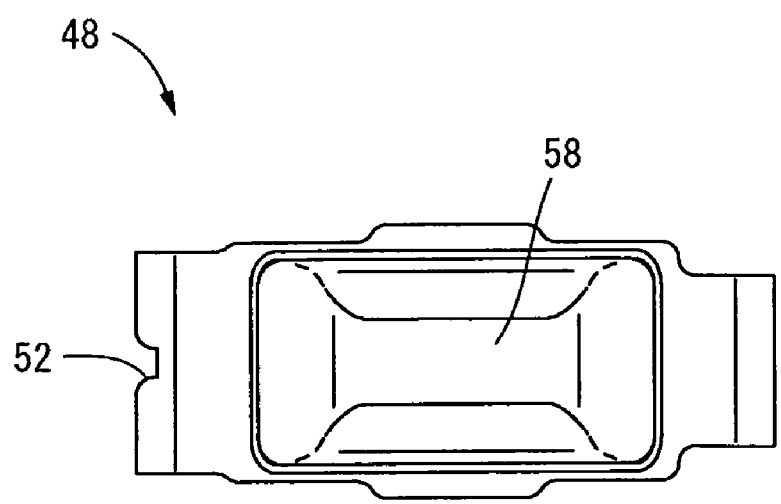
FIG. 12 is a bottom plane view of the orifice member of FIG. 10.
Figure 13:
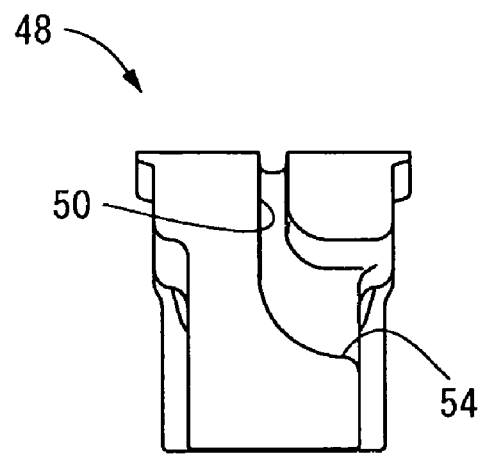
FIG. 13 is a right side view of the orifice member of FIG. 10.
Figure 14:
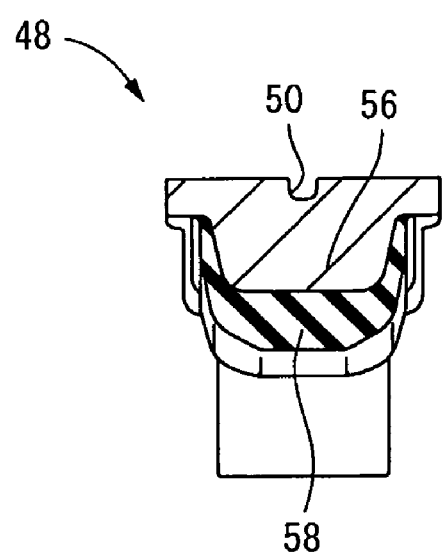
FIG. 14 is a cross sectional view taken along line 14-14 of FIG. 10.
Figure 15:
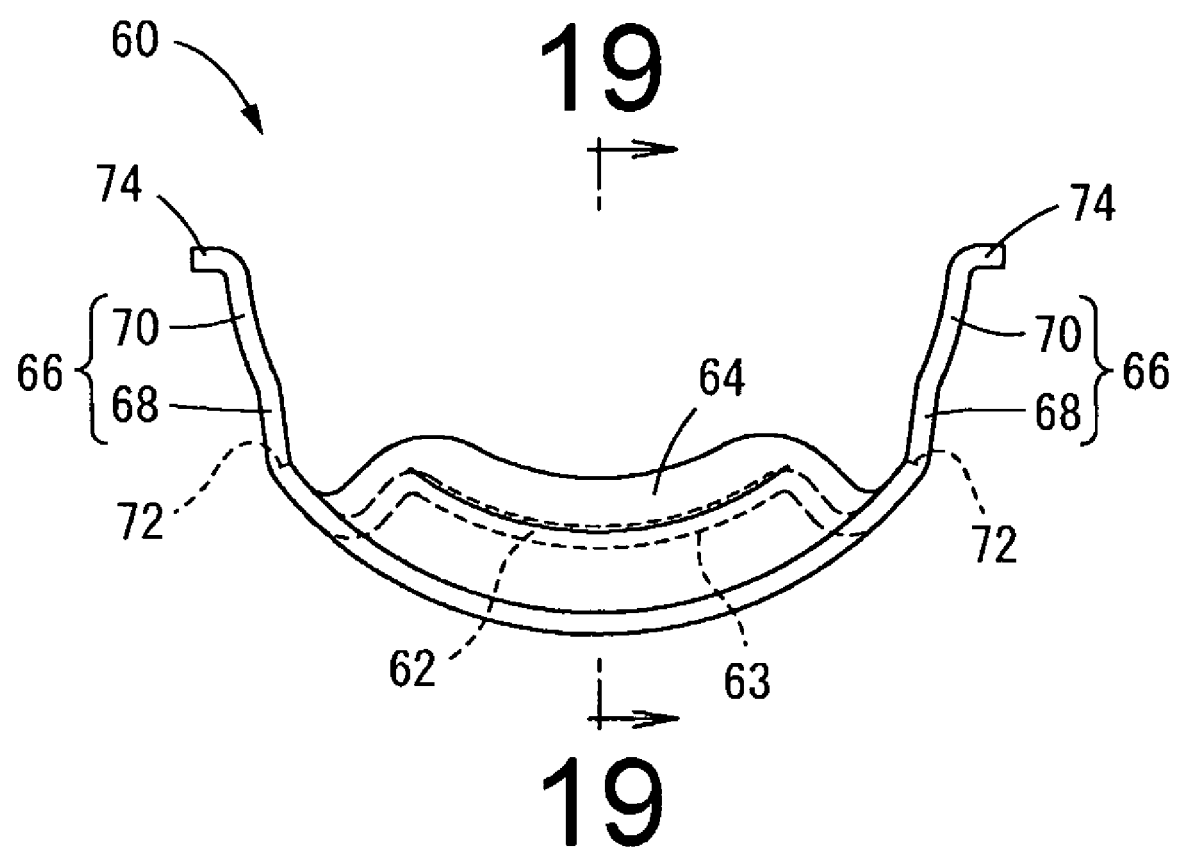
FIG. 15 is a front elevational view of a stopper member of the suspension bushing of FIG. 1.
Figure 16:
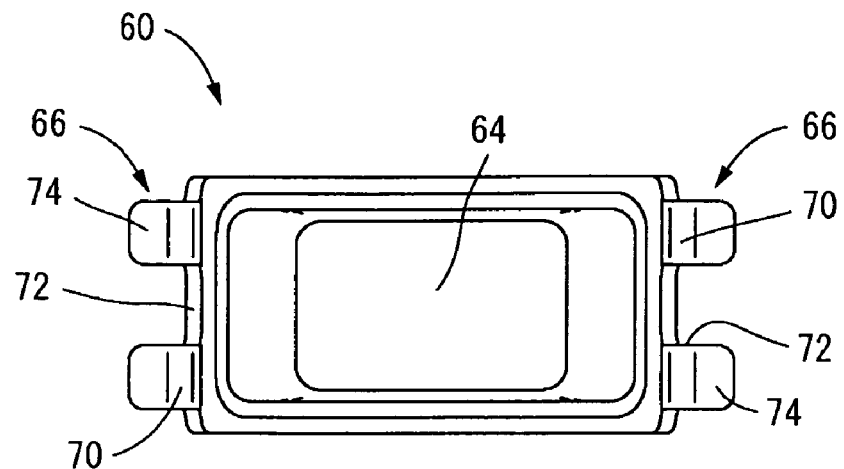
FIG. 16 is a top plane view of the stopper member of FIG. 15.
Figure 17:
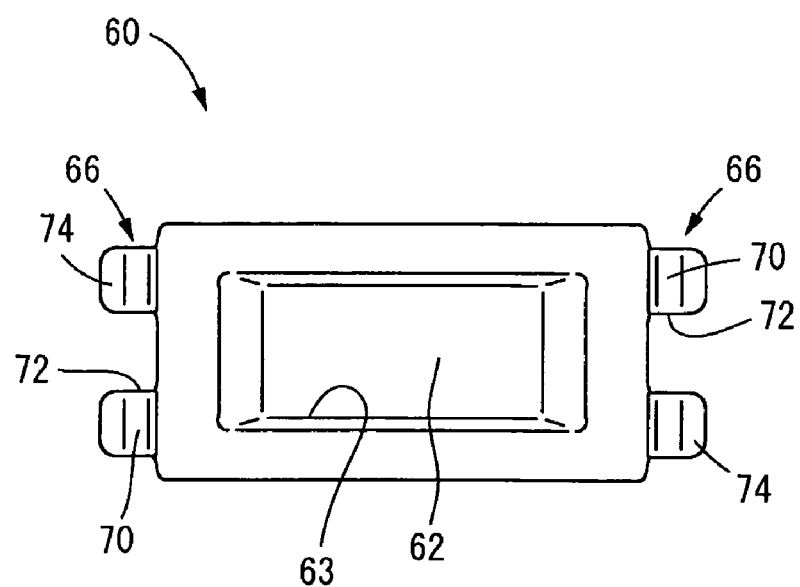
FIG. 17 is a bottom plane view of the stopper member of FIG. 15.
Figure 18:
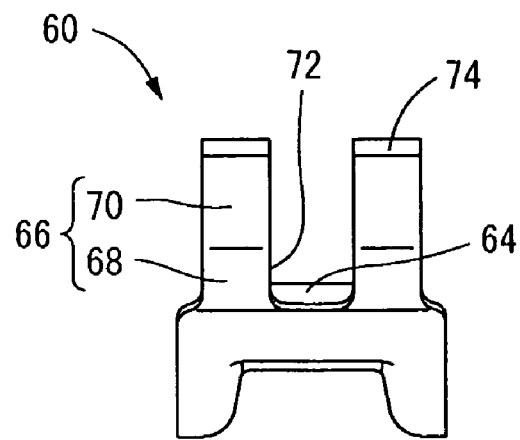
FIG. 18 is one side view of the stopper member of FIG. 15.
Figure 19:
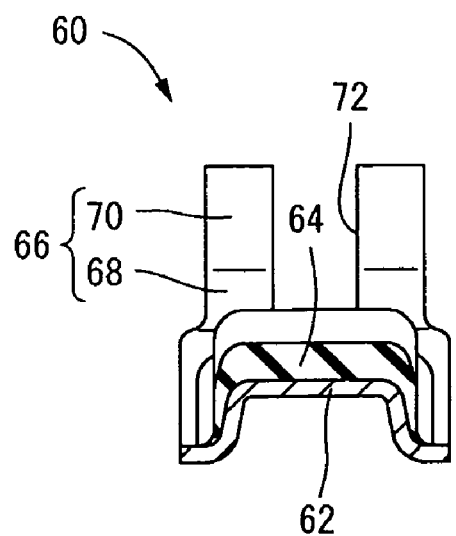
FIG. 19 is a cross sectional view taken along line 19-19 of FIG. 15.

For example, whereas in the embodiment above, positioning of the stopper member 60 in the circumferential direction with respect to the integrally vulcanization molded component 30 (the intermediate sleeve 18) is accomplished through contact of the contact portions 74 formed at the circumferential end edges of the stopper member 60 against the rubber partition 36 and the orifice member 48, it would be possible to instead employ a structure such as that disclosed in FIGS. 11, 12, and 14 of U.S. Pat. No. 7,275,738 or in Japanese Examined Utility Model Publication No. JP-Y-07-40751, wherein a positioning projection is disposed projecting from the inside peripheral face of the circumferentially medial section of the stopper member, and this positioning projection is engaged on a circumferential end edge of a first window portion, thereby positioning the stopper member in the circumferential direction with respect to the integrally vulcanization molded component. Accordingly, the contact portion 74 at the circumferential end edge of the stopper member 60 is not an essential element herein, and the circumferential ends of the stopper member need not contact the rubber partition or the orifice member.

Moreover, whereas in the above embodiment, the orifice passage 90 is formed exclusively to one circumferential side of the first window portion 24, it would also be possible to omit the orifice member 48 and the rubber partition 36 and instead form communication passages to both circumferential sides of the first window portion, with the orifice passage being defined by the pair of communication passages. Where such a pair of communication passages is provided, a broad mating slot will need to be formed at either circumferential end of the communication passages; such a design can be accomplished, for example, by imparting substantial width to the communication passage as a whole, or by making the communication passage wider at its circumferential end sections than in its circumferential center section. As will be apparent from the above, the orifice member 48 is not an essential element herein.

It is moreover possible to provide a stopper member in place of the orifice member 48. Where the orifice member 48 is omitted, it is possible for an axis-perpendicular direction stopper mechanism to be constituted simply by a stopper member disposed on the first fluid chamber side in the embodiment.

Furthermore, whereas in the above embodiment, the first fluid chamber 80 and the second fluid chamber 82 have a pressure-receiving chamber design in which pressure fluctuations are produced on the basis of elastic deformation of the main rubber elastic body 16, it would also be possible, for example, for the wall of either the first fluid chamber or the second fluid chamber to be partly defined by a flexible film, in order to give one of the two chambers an equilibrium chamber design which readily allows changes in volume based on elastic deformation of the flexible film.

Also, while in the above embodiment the stopper member 60 has symmetric shape in the circumferential direction, it may instead, like the orifice member 48, have asymmetric shape by giving the mating elements mutually different axial widthwise dimensions for example. By then forming the mating groove and the support recesses in association with these widthwise dimensions, it is possible, like the orifice member 48, to prevent inadvertent misassembly of the stopper member to the integrally vulcanization molded component.

Additionally, while the above embodiment described embodiment of the present invention in an automotive suspension bushing, the invention could also be embodied in an automotive engine mount, body mount, diff mount, suspension member mount, etc. or in fluid filled type cylindrical vibration damping devices of various kinds in non-automotive applications.

What is claimed is:

1. A fluid filled type cylindrical vibration damping device comprising:
   an integrally vulcanization molded component having an inner shaft member, an intermediate sleeve spaced apart peripherally outward from the inner shaft member, and a main rubber elastic body elastically connecting the inner shaft member and the intermediate sleeve;
an outer tubular member that is slipped externally onto the integrally vulcanization molded component to be affixed to the intermediate sleeve;
a first and a second pocket portion formed in the main rubber elastic body and opening onto an outside peripheral face of the integrally vulcanization molded component through a first and a second window portion formed in the intermediate sleeve;
a first fluid chamber and a second fluid chamber defined to either side of the inner shaft member in the axis-perpendicular direction by the first and second window portions being covered by the outer tubular member; and an orifice passage formed connecting the first fluid chamber and the second fluid chamber;
a stopper member of arcuate plate shape being disposed extending spanning the first window portion in the circumferential direction, with two circumferential ends of the stopper member supported at two circumferential end edges of the first window portion in the intermediate sleeve, and an elastic projection formed extending from at least one of opposed faces of the inner shaft member and the stopper member towards another within the first fluid chamber so that the stopper member and the elastic projection constitute a stopper mechanism in the axis-perpendicular direction; and
a communication passage that extends in the circumferential direction between the intermediate sleeve and the outer tubular member and connects the first window portion with the second window portion being formed at least one circumferential end sides of the first window portion, with a broad mating groove being formed in the communication passage at an end thereof on the first window portion side, and the corresponding circumferential end of the stopper member being supported fitted within the mating groove,
wherein the corresponding circumferential end of the stopper member is formed as a mating element having arcuate plate shape smaller in diameter than a circumferentially center section of the stopper member, the circumferential center section of the stopper member that constitutes the stopper mechanism is juxtaposed against and supported on the outer tubular member, while the mating element disposed at the circumferential end of the stopper member is juxtaposed against and supported on a bottom face of the mating groove in the communication passage, in order to form the communication passage along an entire area between diametrically opposed faces of the mating element and the outer tubular member, and
wherein a cutout portion is formed extending in a circumferential direction from a circumferential end in a widthwise medial section of the mating element, with the communication passage opening into and communicating with the first fluid chamber at a distal end section of the cutout portion situated in the widthwise medial section of the mating element, and at two widthwise side sections of the mating element, respectively, thereby defining the orifice passage that connects the first fluid chamber with the second fluid chamber.

2. The fluid filled type cylindrical vibration damping device according to claim 1, wherein a circumferential end edge of the stopper member curves peripherally outward to form a contact portion, and this contact portion is then disposed in contact against the circumferential end face of the mating groove in the communication passage, to position the stopper member in the circumferential direction with respect to the integrally vulcanization molded component.

3. The fluid filled type cylindrical vibration damping device according to claim 1, wherein an axial widthwise dimension of the communication passage in the mating groove is smaller than an axial widthwise dimension of the first window portion.

4. The fluid filled type cylindrical vibration damping device according to claim 1, wherein the axial widthwise dimension of the mating element is smaller than the axial widthwise dimension of the stopper member in its circumferentially medial section.

5. The fluid filled type cylindrical vibration damping device according to claim 1, wherein an orifice member is attached in the second window portion situated opposite from the stopper member in an axis-perpendicular direction with the inner shaft member interposed therebetween; and a fluid passage communicating at one end with the second fluid chamber and communicating at another end with the communication passage is formed between an outside peripheral face of the orifice member and the outer tubular member so as to define the orifice passage by the communication passage and the fluid passage.

6. The fluid filled type cylindrical vibration damping device according to claim 5, wherein the orifice member constitutes another stopper mechanism situated opposite from the stopper member in an axis-perpendicular direction with the inner shaft member interposed therebetween.

7. The fluid filled type cylindrical vibration damping device according to claim 1, wherein the communication passage is formed exclusively to one circumferential end side of the first window portion; a support recess for receiving the end of the stopper member is formed to another circumferential end side of the first window portion; and the mating elements of respectively identical shape are formed at the two circumferential ends of the stopper member, giving the stopper member as a whole symmetrical shape in the circumferential direction.

8. The fluid filled type cylindrical vibration damping device according to claim 7, wherein the stopper member is positioned in an axial direction with respect to the integrally vulcanization molded component through fitting of the mating elements thereof into the mating groove and into the support recess respectively.

9. The fluid filled type cylindrical vibration damping device according to claim 1, wherein the stopper member comprises a stopper portion whose center projection of hollow trapezoidal shape projecting inward is formed in a circumferentially center section of the stopper member.

10. The fluid filled type cylindrical vibration damping device according to claim 1, wherein the mating element includes the contact portion formed at a circumferential end edge of the stopper member, and the contact portion is of small plate shape extending in a generally straight line diametrically outward from the circumferential end edge of the stopper member with a projecting distal end section of a contact portion being positioned approximately on a circumference of a circle of curvature defining an outside peripheral face of the stopper member.

* * * * *